(12) United States Patent
Sugiyama et al.

(10) Patent No.: US 8,578,910 B2
(45) Date of Patent: Nov. 12, 2013

(54) FUEL INJECTION CONTROLLER

(75) Inventors: Kouichi Sugiyama, Chiryu (JP); Koji Ishizuka, Chita-gun (JP)

(73) Assignee: Denso Corporation, Kariya (JP)

( * ) Notice: Subject to any disclaimer, the term of this patent is extended or adjusted under 35 U.S.C. 154(b) by 692 days.

(21) Appl. No.: 12/796,904

(22) Filed: Jun. 9, 2010

(65) Prior Publication Data

US 2010/0307457 A1    Dec. 9, 2010

(30) Foreign Application Priority Data

Jun. 9, 2009   (JP) ................................ 2009-138439

(51) Int. Cl.
*F02M 51/00*   (2006.01)

(52) U.S. Cl.
USPC .......................................... 123/478; 701/104

(58) Field of Classification Search
USPC ............. 701/106, 101–104; 123/72, 478, 480
See application file for complete search history.

(56) References Cited

U.S. PATENT DOCUMENTS

| | | | | |
|---|---|---|---|---|
| 4,644,920 | A | * | 2/1987 | Abe et al. ....................... 123/479 |
| 5,094,214 | A | * | 3/1992 | Kotzan ............................ 123/479 |
| 5,575,264 | A | * | 11/1996 | Barron ............................ 123/486 |
| 2004/0143695 | A1 | | 7/2004 | Hashimoto et al. |
| 2006/0180122 | A1 | * | 8/2006 | Maekawa et al. ............. 123/299 |
| 2008/0077306 | A1 | * | 3/2008 | Kloppenburg et al. ....... 701/104 |
| 2009/0056676 | A1 | | 3/2009 | Nakata et al. |
| 2009/0056677 | A1 | | 3/2009 | Nakata et al. |
| 2009/0063011 | A1 | | 3/2009 | Nakata et al. |

FOREIGN PATENT DOCUMENTS

| | | |
|---|---|---|
| JP | 6-33828 | 2/1994 |
| JP | 2002-235596 | 8/2002 |

OTHER PUBLICATIONS

U.S. Appl. No. 12/797,070, Yoshida, filed Jun. 9, 2010.
U.S. Appl. No. 12/814,777, Sugiyama et al, filed Jun. 14, 2010.
U.S. Appl. No. 12/813,731, Yamada, filed Jun. 11, 2010.
U.S. Appl. No. 12/796,890, Komatsu, filed Jun. 9, 2010.
U.S. Appl. No. 12/817,266, Yamada et al, filed Jun. 17, 2010.
U.S. Appl. No. 12/817,286, Nakata et al, filed Jun. 17, 2010.
U.S. Appl. No. 12/796,845, Takashima, filed Jun. 9, 2010.
Japanese Office Action dated May 17, 2011, issued in corresponding Japanese Application No. 2009-138439 with English Translation.
Chinese Official Action dated Nov. 15, 2012 issued in corresponding Chinese Application No. 201010198835.4, with English translation.
Office Action (4 pages) dated Jul. 9, 2013, issued in corresponding Chinese Application No. 201010198835.4 and English translation (2 pages).

* cited by examiner

*Primary Examiner* — Stephen K Cronin
*Assistant Examiner* — Arnold Castro
(74) *Attorney, Agent, or Firm* — Nixon & Vanderhye PC

(57) ABSTRACT

A fuel injection controller includes an ECU controlling an operation of a fuel injector based on a characteristic data of the fuel injector, an EEPROM provided to the injector, and an EEPROM provided to the ECU. Identification information by which the fuel injector is individually identified is stored in both of the EEPROMs. It is determined whether the identification information stored in the injector-side EEPROM is identical to the identification information stored in the ECU-side EEPROM. Based on this determination result, it can be determined whether the injector and/or the ECU are exchanged to new one.

6 Claims, 3 Drawing Sheets

INJECTION COMMAND SIGNAL

INJECTION RATE

DETECTION PRESSURE

| IDENTIFICATION INFORMATION | | CONDITION | TREAT |
|---|---|---|---|
| ECU- | INJ- | | |
| NORMAL | NORMAL | INJ OR ECU HAS EXCHANGED | USE INJ-DATA |
| FAULTY | NORMAL | ECU-EEPROM IS FAULTY | USE INJ-DATA |
| NORMAL | FAULTY | INJ-EEPROM IS FAULTY | USE ECU-DATA |
| FAULTY | FAULTY | BOTH EEPROMS ARE FAULTY | CLEAR BOTH DATA |

FUEL INJECTION CONTROLLER

CROSS-REFERENCE TO RELATED APPLICATION

This application is based on Japanese Patent Application No. 2009-138439 filed on Jun. 9, 2009, the disclosure of which is incorporated herein by reference.

FIELD OF THE INVENTION

The present invention relates to a fuel injection controller which controls an operation of a fuel injector provided to an internal combustion engine.

BACKGROUND OF THE INVENTION

Generally, a fuel injection quantity "Q" is controlled depending on a valve opening period "Tq" of an injector. However, due to an individual difference of the injector, a fuel injector quantity "Q" may vary even though the valve opening period "Tq" is constant. Conventionally, a relationship (characteristic data) between the valve opening period "Tq" and the fuel injection quantity "Q" is previously obtained by experiments, and this relationship is stored in a memory of an ECU. After the internal combustion engine is shipped into the market, an operation of a fuel injector is controlled based on the previously stored characteristic data.

JP-2009-74536A (US-2009/0056677A1) shows a fuel injection system in which a fuel pressure sensor is disposed on a fuel injector in order to detect fuel pressure. Based on a variation in the fuel pressure, a variation in a fuel injection rate is estimated. Based on this estimated variation in the fuel injection rate, an actual fuel injection start timing and the fuel injection quantity are computed. In this fuel injection system, it is required to obtain a response delay between an output of a fuel injection start command signal and an actual start of the fuel injection. This response delay is obtained by experiments and is stored in a memory as characteristic data of the injector. Also in this system, after the internal combustion engine is shipped into the market, the fuel injector is controlled based on the stored characteristic data.

In a case that the injector is exchanged into new one after the internal combustion engine is shipped into the market, it is necessary to rewrite the characteristic data stored in the memory into new characteristic data. Also, in a case that the ECU is exchanged into new one, it is necessary to store the characteristic data in a memory of the new ECU.

However, such a rewriting of the characteristic data is not always correctly conducted. It is likely that the characteristic date different from the actual characteristic data are remained in the memory. The fuel injector may be controlled based on the incorrect characteristic data.

The present invention is made in view of the above matters, and it is an object of the present invention to provide a fuel injection controller which can avoid a fuel injector control based on an incorrect characteristic data.

SUMMARY OF THE INVENTION

According to the present invention, a fuel injection controller includes: an electronic control unit controlling an operation of a fuel injector based on a characteristic data of the fuel injector; an injector-side memory means provided to the fuel injector for storing an identification information by which the fuel injector is individually identified; a control-side memory means provided to the electronic control unit for storing the identification information; and a collation means for determining whether the identification information stored in the injector-side memory means is identical to the identification information stored in the control-side memory means.

If the injector or the electronic control unit is exchanged after the fuel injection controller is shipped into a market, the identification information stored in the injector-side memory becomes different from the identification information stored in the control-side memory. Based on the determination result of the collation means, it can be detected whether the injector or the electronic control unit is exchanged to new one. Therefore, when an exchange of the injector or the electronic control unit is detected, it is required to rewrite the characteristic data into new one, so that a fuel injector control based on an improper characteristic data can be avoided.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Hereafter, an embodiment of the present invention will be described. A sensor system is applied to an internal combustion engine (diesel engine) having four cylinders #1-#4.

Figure 1:
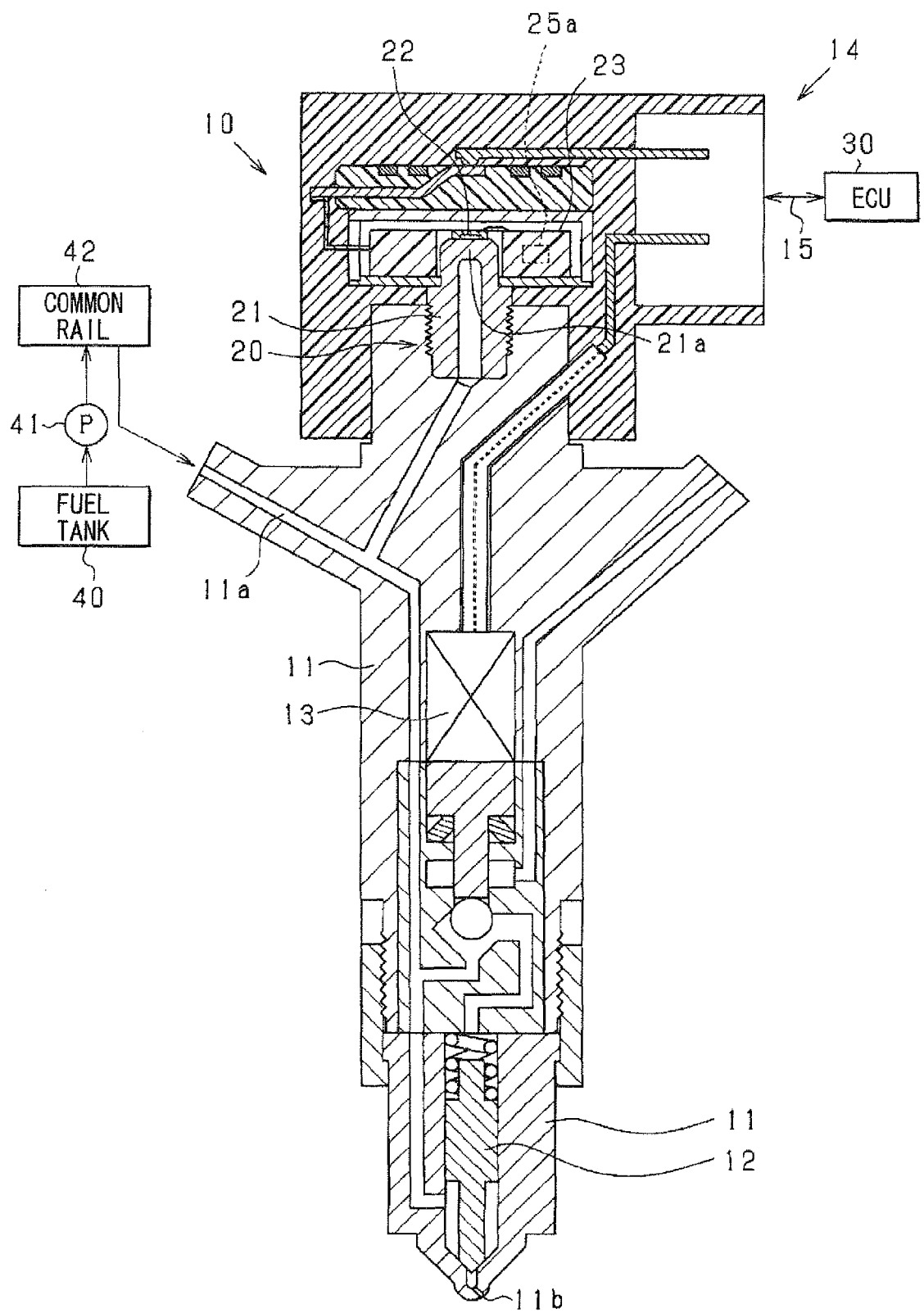
FIG. 1 is a schematic view showing a fuel injection system including a fuel injection controller according to an embodiment of the present invention.

FIG. 1 is a schematic view showing a fuel injector 10 provided to each cylinder, a fuel pressure sensor 20 provided on the fuel injector, and an electronic control unit (ECU) 30.

First, a fuel injection system of the engine including the fuel injector 10 will be explained. A fuel in a fuel tank 40 is pumped up by a high-pressure pump 41 and is accumulated in a common rail 42 to be supplied to each injector 10.

The fuel injector 10 is comprised of a body 11, a needle (valve body) 12, an actuator 13 and the like. The body 11 defines a high pressure passage 11a and an injection port 11b. The needle 12 is accommodated in the body 11 to open/close the injection port 11b. The actuator 13 drives the needle 12.

The ECU 30 controls the actuator 13 to drive the needle 12. When the needle 12 opens the injection port 11b, high-pressure fuel in the high pressure passage 11a is injected to a combustion chamber (not shown) of the engine. The ECU 30 computes a fuel injection start timing, a fuel injection end timing, a fuel injection quantity and the like based on an engine speed, an engine load and the like. The actuator 13 drives the needle 12 in such a manner as to obtain the above computed value.

A structure of the fuel pressure sensor 20 will be described hereinafter.

The fuel pressure sensor 20 includes a stem (load cell), a pressure sensor element 22 and a molded IC 23. The stem 21 is provided to the body 11. The stem 21 has a diaphragm 21a which elastically deforms in response to high fuel pressure in the high pressure passage 11a.

The pressure sensor element 22 is disposed on the diaphragm 21a to output a pressure detection signal depending on an elastic deformation of the diaphragm 21a.

The molded IC 23 includes an amplifying circuit which amplifies the pressure detection signal outputted from the pressure sensor element 22. Further, the molded IC 23 includes an EEPROM 25a which is a rewritable nonvolatile memory. This EEPROM 25a corresponds to an injector-side memory means.

A connector 14 is provided on the body 11. The molded IC 23, the actuator 13 and the ECU 30 are electrically connected to each other through a harness 15 connected to the connector 14.

Figure 2A:
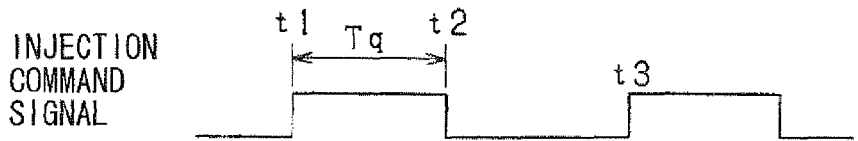
FIG. 2A is a time chart showing an injection command signal.
Figure 2B:
FIG. 2B is a time chart showing a fuel injection rate.
Figure 2C:
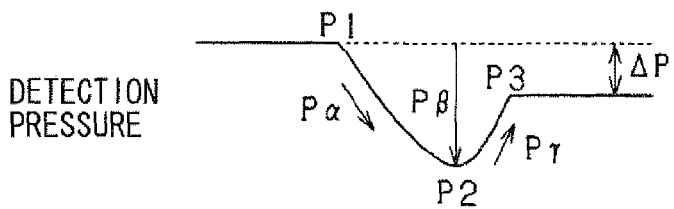
FIG. 2C is a time chart showing a detection pressure detected by a fuel pressure sensor.

When the fuel injection is started, the fuel pressure in the high pressure passage 11a starts to decrease. When the fuel injection is terminated, the fuel pressure in the high pressure passage 11a starts to increase. That is, a variation in the fuel pressure and a variation in the injection rate have a correlation, so that the variation in the injection rate can be estimated from the variation in the fuel pressure. Based on this estimated variation in the injection rate, various control parameters used for a fuel injection control can be obtained to be learned. These control parameters correspond to characteristic data of the fuel injector 10. Referring to FIGS. 2A-2C, the control parameters will be described hereinafter.

FIG. 2A shows injection command signals which the ECU 30 outputs to the actuator 13. Based on this injection command signal, the actuator 13 operates to open the injection port 11b. That is, a fuel injection is started at a pulse-on timing t1 of the injection command signal, and the fuel injection is terminated at a pulse-off timing t2 of the injection command signal. During a time period "Tq" from the timing t1 to the timing t2, the injection port 11b is opened. By controlling the time period "Tq", the fuel injection quantity "Q" is controlled.

FIG. 2B shows a variation in fuel injection rate, and FIG. 2C shows a variation waveform in detection pressure. Since the variation in the detection pressure and the variation in the injection rate have a relationship described below, a waveform of the injection rate can be estimated based on a waveform of the detection pressure.

That is, as shown in FIG. 2A, after the injection command signal rises at the timing t1, the fuel injection is started and the injection rate starts to increase at a timing R1. When the injection rate starts to increase at the timing R1, the detection pressure starts to decrease at a timing P1. Then, when the injection rate reaches the maximum injection rate at a timing R2, the detection pressure drop is stopped at a timing P2. When the injection rate starts to decrease at a timing R2, the detection pressure starts to increase at a timing P2. Then, when the injection rate becomes zero and the actual fuel injection is terminated at a timing R3, the increase in the detection pressure is stopped at a timing P3.

As described above, by detecting the timings P1 and P3, the injection start timing R1 and the injection terminate timing R3 can be computed. Based on a relationship between the variation in the detection pressure and the variation in the fuel injection rate, which will be described below, the variation in the fuel injection rate can be estimated from the variation in the detection pressure.

That is, a decreasing rate $P\alpha$ of the detection pressure from the timing P1 to the timing P2 has a correlation with an increasing rate $R\alpha$ of the injection rate from the timing R1 to the timing R2. An increasing rate $P\gamma$ of the detection pressure from the timing P2 to the timing P3 has a correlation with a decreasing rate $R\gamma$ of the injection rate from the timing R2 to the timing R3. A maximum pressure drop amount $P\beta$ of the detected pressure has a correlation with a maximum injection rate $R\beta$. Therefore, the increasing rate $R\alpha$ of the injection rate, the decreasing rate $R\gamma$ of the injection rate, and the maximum injection rate $R\beta$ can be computed by detecting the decreasing rate $P\alpha$ of the detection pressure, the increasing rate $P\gamma$ of the detection pressure, and the maximum pressure drop amount $P\beta$ of the detection pressure. The variation in the injection rate (variation waveform) shown in FIG. 2B can be estimated by computing the timings R1, R3, the rates $R\alpha$, $R\gamma$, and the maximum injection rate $R\beta$.

Furthermore, an integral value "S" of the injection rate from the timing R1 to the timing R3 (shaded area in FIG. 2B) is equivalent to the injection quantity "Q". An integral value of the detection pressure from the timing P1 to the timing P3 has a correlation with the integral value "S" of the injection rate. Thus, the integral value "S" of the injection rate, which corresponds to the injection quantity "Q", can be computed by computing the integral value of detection pressure.

The timings t1, t2, the time period "Tq", the timings R1, R2, the rates $R\alpha$, $R\beta$, $R\beta$, and the fuel injection quantity "Q" are learned and stored as the control parameters (characteristic data).

The actual injection start timing R1 can be learned as the response delay between the pulse-on timing t1 and the actual injection start timing R1. The timings R1 and R3 can be learned as the fuel injection period. A fuel pressure drop $\Delta P$ from P1 to P3 can be learned as the control parameter. Alternatively, the correction amount to the control parameters can be learned as the control parameter.

Figure 3:
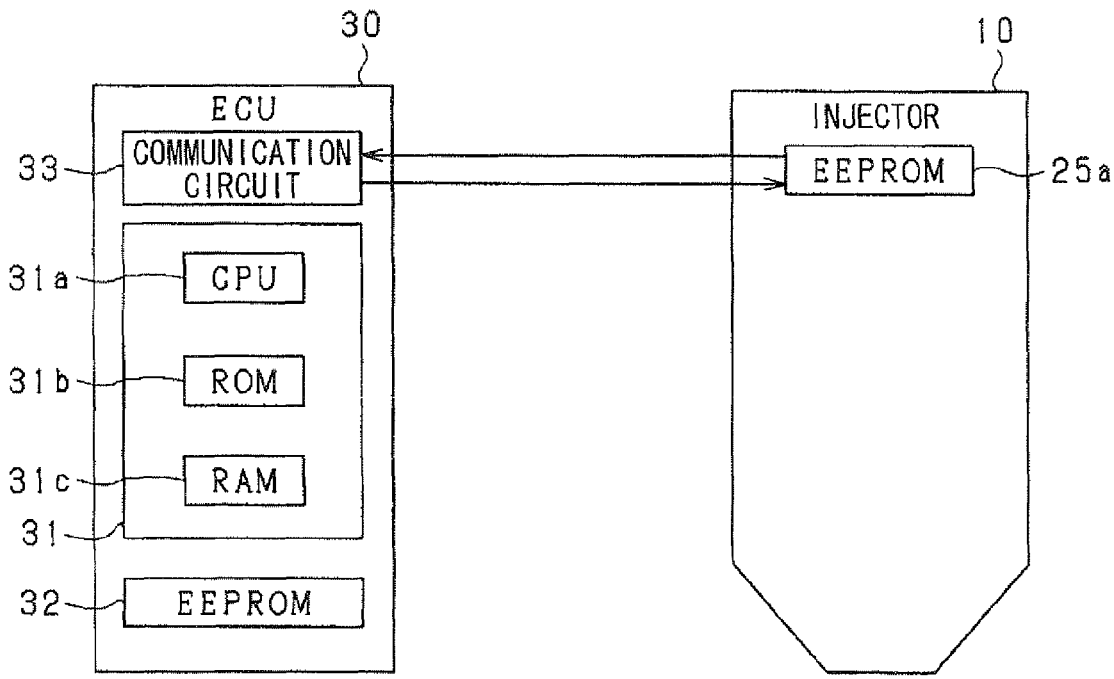
FIG. 3 is a block diagram showing the fuel injection controller.

A microcomputer 31 of the ECU 30, which is shown in FIG. 3, generates the fuel injection command signal according to an engine load and an engine speed. The rising timing t1, the falling timing t2, and the fuel injection period "Tq" of the fuel injection command signal are computed considering the learned control parameters.

As shown in FIG. 3, the ECU 30 includes a microcomputer 31, an EEPROM 32, and a communication circuit 33. The EEPROM 32 corresponds to a control-side memory means, and the communication circuit 33 functions as a communication interface. The microcomputer 31 includes a CPU 31a, a ROM 31b, and a RAM 31c.

Initial values of the characteristic data described above are previously obtained by experiments before the injector 10 is shipped into the market. These initial values of the characteristic data are stored in the EEPROM 25a of the injector 10 before the shipping of the injector 10. The EEPROM 25a of the injector 10 is referred to as the INJ-EEPROM 25a hereinafter.

Furthermore, the INJ-EEPROM 25a stores an ID number (identification information) of the injector 10 for performing individual identification of the injector 10. Moreover, when the engine is shipped into the market, the identification information of the injector 10 is stored in the EEPROM 32 of the ECU 30. The EEPROM 32 of the ECU 30 is referred to as the ECU-EEPROM 32 hereinafter. The identification information stored in the INJ-EEPROM 25a is referred to as the INJ-IDINFO, and the identification information stored in the ECU-EEPROM 32 is referred to as the ECU-IDINFO, hereinafter.

The learned characteristic data are temporarily stored in the RAM 31c of the microcomputer 31. When the operation of the engine is terminated, these characteristic data are stored in the ECU-EEPROM 32 and the INJ-EEPROM 25a. Hereinafter, the characteristics data stored in the INJ-EEPROM 25a are referred to as the INJ-DATA, and the characteristic data stored in the ECU-EEPROM 32 is referred to as the ECU-DATA.

The communication circuit 33 is electrically connected to the INJ-EEPROM 25a so that the communication circuit 33 reads the INJ-IDINFO and the INJ-DATA stored in the INJ-EEPROM 25a. Furthermore, the communication circuit 33 updates the INJ-DATA.

If the injector 10 is exchanged to new one after the engine is shipped into the market, it is necessary to rewrite the stored ECU-DATA into a new ECU-DATA of new injector 10. Similarly, if the ECU 30 is exchanged to new one after the engine is shipped into the market, it is necessary to rewrite the ECU-DATA into the characteristic data of the injector 10 which is currently mounted.

According to the present embodiment, even if the injector 10 and/or the ECU 30 are exchanged into new one, the fuel injection control can be performed according to the characteristic data of the injector 10 which is currently mounted to the engine.

Figures 4, 5:
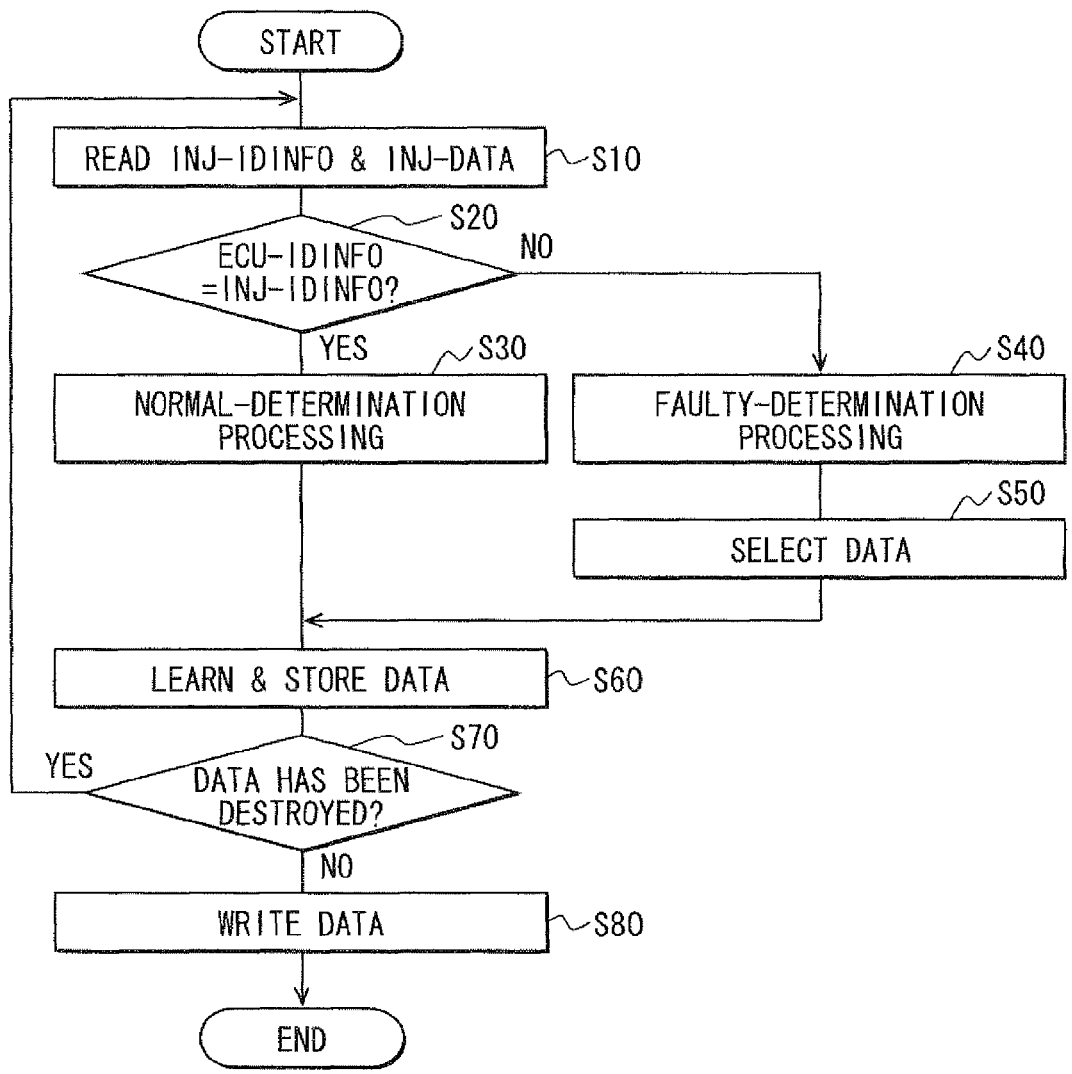
FIG. 4 is a flowchart showing a processing of an identification information and a characteristic data stored in EEPROMs shown in FIG. 3.
FIG. 5 is a table showing a processing content of the flowchart shown in FIG. 4.

Referring to FIG. 4, the processing regarding to the INJ-IDINFO, the ECU-IDINFO, the INJ-DATA, and the ECU-DATA will be described, hereinafter. The processing shown in FIG. 4 is executed by the microcomputer 31 of the ECU 30. When the ECU 30 is energized, the process is started. When the ECU 30 is deenergized, the process is terminated.

First, in step S10, the INJ-IDINFO and the INJ-DATA transmitted from the INJ-EEPROM 25a to the ECU 30 are read.

In step S20 (collation means), the computer determines whether the ECU-IDINFO are consistent with the INJ-IDINFO.

When the answer is YES in step S20, the computer determines that the injector 10 and the ECU 30 have not been exchanged after the engine is shipped into the market. The procedure proceeds to step S30.

In step S30 (data determination means), the computer executes a normal-determination processing in which it is determined whether the INJ-DATA and the ECU-DATA are normal data. Normal characteristic data are selected among the INJ-DATA and ECU-DATA. These selected normal data are used as the control parameters for the fuel injection control. It should be noted that the characteristic data may become faulty due to electric noises or physical malfunctions of the ECU-EEPROM 32 or the INJ-EEPROM 25a.

The checksum or the comparison determination is executed as the normal-determination processing to determine whether the INJ-DATA and the ECU-DATA are normal data.

In the comparison determination, the identical ECU-DATA are stored in a plurality of memory areas of the ECU-EEPROM 32. When each ECU-DATA stored in each memory area is identical to each other, the computer determines that the ECU-DATA are normal data. When some of the ECU-DATA stored in certain memory areas are different from those stored in the other memory areas, the number of the identical ECU-DATA and the number of the non-identical ECU-DATA are compared with each other. The major ECU-DATA is used as the normal ECU-DATA.

Similarly, the identical INJ-DATA are stored in a plurality of memory areas of the INJ-EEPROM 25a. When each INJ-DATA stored in each memory area is identical to each other, the computer determines that the INJ-DATA are normal data. When the INJ-DATA in each memory area is non-identical, the major INJ-DATA is used as normal data.

Alternatively, the comparison determination may be performed with respect to both the ECU-DATA and the INJ-DATA. The major ECU-DATA and the major INJ-DATA can be used as normal data, respectively.

Moreover, if at least one abnormal data is detected among a plurality of INJ-DATA, the ECU-DATA is used as the control parameter for fuel injection control. Similarly, if at least one abnormal data is detected among a plurality of ECU-DATA, the INJ-DATA is used as the control parameter for fuel injection control.

As above, in step S30, the normal characteristic data are selected among the INJ-DATA and the ECU-DATA in order not to perform the fuel injection based on the faulty characteristic data.

When the answer is NO in step S20, the computer determines that at least one of the injector 10 and the ECU 30 is exchanged into new one. The procedure proceeds to step S40.

In step S40 (information-determination means), the computer executes a faulty-determination processing in which it is determined whether the ECU-IDINFO and the INJ-IDINFO are faulty. It should be noted that the identification information may become faulty due to electric noises or physical malfunctions of the ECU-EEPROM 32 or the INJ-EEPROM 25a.

The checksum or the comparison determination is performed as the faulty-determination processing to determine whether the INJ-IDINFO and the ECU-IDINFO are normal data.

In the comparison determination, the identical ECU-IDINFO is stored in a plurality of memory areas of the ECU-EEPROM 32. When each ECU-IDINFO stored in each memory area is identical to each other, the computer determines that the ECU-IDINFO is normal data. Similarly, the identical INJ-IDINFO is stored in a plurality of memory areas of the INJ-EEPROM 25a. When each INJ-IDINFO stored in each memory area is identical to each other, the computer determines that the INJ-IDINFO is normal data.

Then, the procedure proceeds to step S50 in which the computer selects one of the INJ-DATA and the ECU-DATA according to the determination result in step S40. The selected characteristic data are used as the control parameter for fuel injection control.

FIG. 5 is a table showing a relation between the determination result in step S40, an exchange condition indicative of whether the injector 10 and the ECU 30 have been exchanged, and the selected characteristic data to be used for the fuel injection control.

When it is determined that both of the ECU-IDINFO and the INJ-IDINFO are normal data in step S40, the computer determines that the injector 10 or the ECU 30 has been exchanged. Thus, the INJ-DATA is used as the control parameter for the fuel injection.

When it is determined that the INJ-IDINFO is normal data and the ECU-IDINFO is faulty data in step S40, the computer determines that the ECU-EEPROM 32 is faulty and the ECU-DATA is also faulty data. Thus, the INJ-DATA is used as the control parameter for the fuel injection.

When it is determined that the INJ-IDINFO is faulty data and the ECU-IDINFO is normal data in step S40, the computer determines that the INJ-EEPROM 25a is faulty and the INJ-DATA is also faulty data. Thus, the ECU-DATA is used as the control parameter for the fuel injection.

When it is determined that both of the ECU-IDINFO and the INJ-IDINFO are faulty data in step S40, the computer determines that both of the ECU-EEPROM 32 and the INJ-EEPROM 25*a* are faulty and both of the ECU-DATA and the INJ-DATA are also faulty data. Thus, none of the characteristic data is selected and the INJ-DATA and the ECU-DATA are cleared. In this case, it is desirable to use the initial value of the characteristic data established previously as a control parameter.

Moreover, it is desirable to execute the normal-determination processing with respect to the characteristic data selected in step S50. That is, with respect to the selected characteristic data, the normal-determination processing by Check Sum or a comparison determination is executed.

In a case that the ECU-DATA is selected, when each ECU-DATA stored in a plurality of memory areas of the ECU-EEPROM 32 are identical to each other, the computer determines that the ECU-DATA is normal data. When some of the ECU-DATA stored in certain memory areas are different from those stored in the other memory areas, the number of the identical ECU-DATA and the number of the non-identical ECU-DATA are compared with each other. The major ECU-DATA is used as the normal ECU-DATA. Also in a case that the INJ-DATA is selected, the same operation is executed.

In step S60 (learning means), the characteristic data are learned and stored in the RAM 31*c* of the ECU 30.

In step S70, it is determined whether the characteristic data stored in the RAM 31*c* has been destroyed. When the answer is NO, the procedure proceeds to step S80. In step S80, at a time when an ignition switch is turned off to stop the engine, the characteristic data stored in the RAM 31*c* as the learning value are written and stored in the ECU-EEPROM 32 and the INJ-EEPROM 25*a*. When the answer is NO in step S70, the procedure goes back to the step S10.

According to the present embodiment described above, following advantages can be obtained.

(1) The identification information for performing individual identification of the injector 10 is stored in both of the memories of the ECU-EEPROM 32 and the INJ-EEPROM 25*a*. And then, it is determined whether the identification information stored in each EEPROM 32, 25*a* is identical to each other. When they are identical to each other, the computer determines that the fuel injector has not been exchanged. When they are not identical to each other, the computer determines that the fuel injector has been exchanged. Thus, it is less likely that the fuel injection is controlled based on characteristic data which is different from an actual characteristic date of the injector currently installed.

(2) Since the updated characteristic data is stored not only in the ECU-EEPROM 32 but also in the INJ-EEPROM 25*a*, even if one of the EEPROMs 32, 25*a* becomes faulty, it can be avoided that all characteristic data is destroyed. Thus, a reliability of the fuel injection control based on the characteristic data is improved.

(3) Even in a case that the INJ-IDINFO and the ECU-IDINFO are identical with each other, since the normal-determination processing is executed to determine whether the characteristic data for controlling the fuel injection is normal data, it is less likely that the fuel injection is performed based on the faulty characteristic data.

(4) When it is determined that the INJ-IDINFO and the ECU-IDINFO are not identical with each other, the fuel injection control is performed based on the INJ-DATA of the injector 10 actually installed. It is less likely that the fuel injection is performed based on the faulty characteristic data.

However, even in a case that the INJ-IDINFO and the ECU-IDINFO are not identical with each other, when a faulty is detected in the INJ-IDINFO, the computer determines that the INJ-DATA is also faulty as well as the INJ-IDINFO. The computer controls the fuel injection based on the ECU-DATA, so that the reliability of the fuel injection control can be improved.

(5) During an operation of the engine, the characteristic data are stored in the RAM 31*c*. During an engine stop, the characteristic data are transferred to the EEPROMs 32, 25*a*. Compared with a case where the characteristic data stored in the EEPROMs 32, 25*a* are updated during the operation of the engine, the product life of the EEPROMs 32, 25*a* can be extended.

[Other Embodiment]

The present invention is not limited to the embodiments described above, but may be performed, for example, in the following manner. Further, the characteristic configuration of each embodiment can be combined.

- The faulty-determination processing may be executed with respect to the INJ-DATA and the ECU-DATA. Based on this determination result, the characteristic data for the fuel injection can be selected.
- The INJ-EEPROM 25*a* may be provided to the body 11 or the connector 14.
- The characteristic data is not limited to the timings t1, t2, the time period "Tq", the timings R1, R2, the rates R$\alpha$, R$\beta$, R$\beta$, and the fuel injection quantity "Q".
- As long as the identification information is stored in the INJ-EEPROM 25*a*, it is not always necessary to store the characteristic data in the INJ-EEPROM 25*a*. Even in this case, the above advantage (1) can be achieved.
- The INJ-EEPROM 25*a* can be replaced by a non-rewritable memory.

What is claimed is:

1. A fuel injection controller, comprising:

an electronic control unit controlling an operation of a fuel injector based on a characteristic data of the fuel injector;

an injector-side memory means provided to the fuel injector for storing an identification information by which the fuel injector is individually identified;

a control-side memory means provided to the electronic control unit for storing the identification information;

a collation means for determining whether the identification information stored in the injector-side memory means is identical to the identification information stored in the control-side memory means, and an information-determination means for determining whether the identification information stored in the injector-side memory means and the control-side memory means are faulty, wherein the characteristic data of the fuel injector is updated by learning, the injector-side memory means stores the characteristic data of the fuel injector, the control-side memory means stores the characteristic data of the fuel injector, and when the identification information stored in the injector-side memory means is not identical to the identification information stored in the control-side memory means, one of the characteristic data stored in the injector-side memory means and the characteristic data stored in the control-side memory means is selected according to a determination result of the information-determination means.

2. A fuel injection controller according to claim 1, wherein when the collation means determines that the identification information stored in the injector-side memory means and the identification information stored in the control-side memory means are not identical to each other and when the information-determination means determines that the identification information stored in the injector-side memory means and the control-side memory means are normal, an electronic control unit controls the operation of the fuel injector based on a characteristic data stored in the injector-side memory means.

3. A fuel injection controller according to claim 1, wherein when the collation means determines that the identification information stored in the injector-side memory means and the identification information stored in the control-side memory means are not identical to each other and when the information-determination means determines that the identification information stored in the injector-side memory means is normal and the identification information stored in the control-side memory means is faulty, an electronic control unit controls the operation of the fuel injector based on a characteristic data stored in the injector-side memory means.

4. A fuel injection controller according to claim 1, wherein when the collation means determines that the identification information stored in the injector-side memory means and the identification information stored in the control-side memory means are not identical to each other and when the information-determination means determines that the identification information stored in the injector-side memory means is faulty and the identification information stored in the control-side memory means is normal, an electronic control unit controls the operation of the fuel injector based on a characteristic data stored in the control-side memory means.

5. A fuel injection controller according to claim 1, wherein when the collation means determines that the identification information stored in the injector-side memory means and the identification information stored in the control-side memory means are not identical to each other and when the information-determination means determines that the identification information stored in the injector-side memory means and the control-side memory means are faulty, the characteristic data stored in the control-side memory means and the injector-side memory means are cleared.

6. A fuel injection controller, comprising:
an injector-side memory provided to a fuel injector for storing an identification information by which the fuel injector is individually identified and for storing characteristic data of the fuel injector;
a control-side memory provided to an electronic control unit for storing identification information and for storing characteristic data of the fuel injector; and
a processing system, comprising a computer processor, the processing system being configured to:
  determine whether the identification information stored in the injector-side memory corresponds to the identification information stored in the control-side memory;
  determine whether at least one of the identification information stored in the injector-side memory or the control-side memory is faulty;
  select one of the characteristic data stored in the injector-side memory or the characteristic data stored in the control-side memory according to a determination that the identification information stored in the injector-side memory does not correspond to the identification information stored in the control-side memory and a determination that at least one of the identification information stored in the injector-side memory or the control-side memory is faulty; and
  use the selected characteristic data for fuel injection control;
wherein the characteristic data of the fuel injector is updatable.

\* \* \* \* \*